US011265802B2

(12) United States Patent
Shinohara et al.

(10) Patent No.: US 11,265,802 B2
(45) Date of Patent: Mar. 1, 2022

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1 day.

(21) Appl. No.: 15/752,751

(22) PCT Filed: Aug. 15, 2016

(86) PCT No.: PCT/JP2016/073839
§ 371 (c)(1),
(2) Date: Feb. 14, 2018

(87) PCT Pub. No.: WO2017/033790
PCT Pub. Date: Mar. 2, 2017

(65) Prior Publication Data
US 2018/0242222 A1 Aug. 23, 2018

(30) Foreign Application Priority Data
Aug. 21, 2015 (JP) .............................. JP2015-164097

(51) Int. Cl.
*H04W 48/06* (2009.01)
*H04L 1/00* (2006.01)
(Continued)

(52) U.S. Cl.
CPC .......... *H04W 48/06* (2013.01); *H04L 1/0001* (2013.01); *H04W 52/243* (2013.01);
(Continued)

(58) Field of Classification Search
CPC ..... H04W 72/04; H04W 88/08; H04W 76/00; H04W 48/06; H04W 52/243;
(Continued)

(56) References Cited

U.S. PATENT DOCUMENTS

2007/0042784 A1* 2/2007 Anderson .............. H04B 17/24
455/450
2007/0149227 A1* 6/2007 Parizhsky ......... H04W 72/0413
455/509
(Continued)

FOREIGN PATENT DOCUMENTS

| WO | WO-2010/083661 A1 | 7/2010 |
| WO | WO-2014/190290 A1 | 11/2014 |
| WO | WO-2015/038930 A1 | 3/2015 |

OTHER PUBLICATIONS

International Preliminary Report on Patentability for PCT/JP2016/073839, IB, Geneva, (Ch. I), with English Translation, dated Feb. 27, 2017 incorporating the English translation of the Written Opinion of the ISA, ISA/JP, dated Oct. 11, 2016.
(Continued)

*Primary Examiner* — Hassan A Phillips
*Assistant Examiner* — Prenell P Jones
(74) *Attorney, Agent, or Firm* — Harness, Dickey & Pierce, P.L.C.

(57) ABSTRACT

Provided is a wireless communication system in which a plurality of basic service sets (BSSs) performing wireless transmission from a transmitting station to a destination station by performing access control based on CSMA/CA exist adjacent to each other, and in which wireless commu-
(Continued)

nication is performed by controlling a CCA threshold considering an interference power value between each BSS that uses the same channel, in which the transmitting station includes a control block determining the CCA threshold value according to the interference power value of the BSS considered as an interference source, calculating a SINR in the destination station according to the interference power value, determining a MCS which is a combination of a modulation scheme and a code rate according to the SINR, and performing the access control based on the CSMA/CA.

7 Claims, 8 Drawing Sheets

(51) Int. Cl.
    *H04W 52/24*     (2009.01)
    *H04W 72/08*     (2009.01)
    *H04W 74/08*     (2009.01)
    *H04W 84/12*     (2009.01)

(52) U.S. Cl.
    CPC ..... *H04W 72/082* (2013.01); *H04W 74/0816* (2013.01); *H04L 1/0003* (2013.01); *H04W 84/12* (2013.01)

(58) Field of Classification Search
    CPC ........... H04W 72/082; H04W 74/0816; H04W 84/12; H04L 1/0003; H04L 1/0001
    See application file for complete search history.

(56) References Cited

U.S. PATENT DOCUMENTS

| | | | |
|---|---|---|---|
| 2007/0242621 A1 | 10/2007 | Nandagopalan et al. | |
| 2009/0323608 A1* | 12/2009 | Adachi | H04W 48/18 370/329 |
| 2011/0116489 A1* | 5/2011 | Grandhi | H04W 16/04 370/338 |
| 2013/0017794 A1* | 1/2013 | Kloper | H04W 74/0808 455/63.1 |
| 2014/0328269 A1 | 11/2014 | Zhu et al. | |
| 2015/0223257 A1* | 8/2015 | Wilhelmsson | H04W 76/14 455/452.1 |
| 2015/0249936 A1* | 9/2015 | Chen | H04W 28/065 370/329 |
| 2015/0333948 A1* | 11/2015 | Richardson | H04W 72/0413 370/329 |
| 2016/0174079 A1* | 6/2016 | Wang | H04W 16/14 455/454 |
| 2016/0174254 A1* | 6/2016 | Hedayat | H04W 74/006 370/329 |
| 2016/0227489 A1 | 8/2016 | Oteri et al. | |
| 2016/0262054 A1* | 9/2016 | Singh | H04W 74/0808 |
| 2017/0325100 A1* | 11/2017 | Urabayashi | H04W 16/14 |
| 2018/0343096 A1* | 11/2018 | Kim | H04L 27/0006 |

OTHER PUBLICATIONS

Extented European Search Report for EPSN 168391373, dated Feb. 14, 2019.
Korean Office Action regarding KR1020187004866, dated Sep. 26, 2019.
IEEE 802.11-15/0371-02-00ax, "Proposal and simulation based evaluation of DSC-AP algorithm", dated Mar. 2015.
Oni, Phillip Babatunde, "Access Point Association Coordination In Densely Deployed 802.11 Wireless Networks", dated Aug. 2015.
International Search Report for PCT/JP2016/073839, ISA/JP, Tokyo, dated Oct. 11, 2016 with English translation.
Written Opinion of the ISA for PCT/JP2016/073839, ISA/JP, Tokyo, dated Oct. 11, 2016.
Robert Stacey, et al.; "Proposed Specification Framework for TGax"; Doc.: IEEE802.11-14/1453r2, issued Nov. 5, 2014.
"Part 11: Wireless LAN Medium Access Control (MAC) and Physical (PHY) Layer Specifications"; IEEE Std 802.11ac(TM)-2013; IEEE Standard for Information technology—Telecommunications and information exchange between systems Local and metropolitan area networks, issued Dec. 11, 2013.
Graham Smith; "Dynamic Sensitivity Control Practical Usage"; IEEE 802.11-14/0779r2, issued Jul. 2014.
Indian Office Action from counterpart IN201817006351, dated Mar. 18, 2020.

* cited by examiner

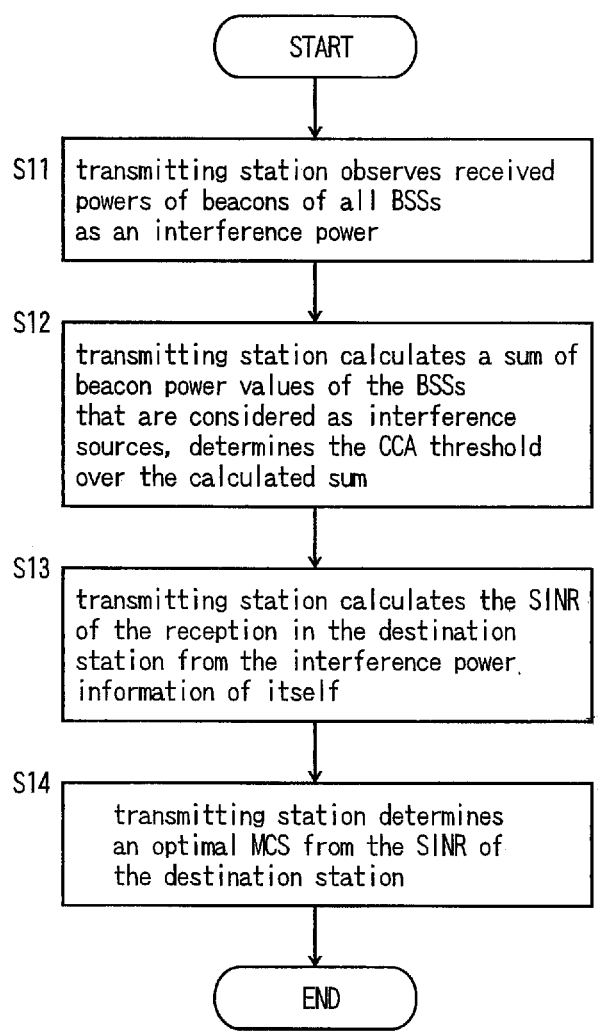
F I G. 2

(a) Before DSC (before control CCA threshold)

(b) After DSC (after control CCA threshold)

(a) Example which doesn't control CCA threshold (b) Example which control CCA threshold

WIRELESS COMMUNICATION SYSTEM AND WIRELESS COMMUNICATION METHOD

CROSS REFERENCE TO RELATED APPLICATIONS

This application is a U.S. National Stage application claiming the benefit of prior filed International Application Number PCT/JP2016/073839, filed on Aug. 15, 2016, in which the International Application claims priority from Japanese Patent Application Number 2015-164097, filed on Aug. 21, 2015, the entire contents of which are incorporated herein by reference.

TECHNICAL FIELD

The present invention relates to a wireless communication system and a wireless communication method that mitigate a decrease in throughput due to carrier sense multiple access with collision avoidance (CSMA/CA) protocol carried out by each communication station, in a wireless local area network (LAN) high density environment.

BACKGROUND ART

In recent years, with the spread of high-performance portable wireless station, such as a notebook computer and a smart phone, wireless LANs in compliance with IEEE 802.11 standard have come into wide use not only in companies and public spaces, but also in ordinary houses. As the wireless LANs in compliance with IEEE 802.11 standard, there are a wireless LAN in compliance with IEEE 802.11b/g/n that uses a 2.4 GHz frequency band and a wireless LAN in compliance with IEEE 802.11a/n/ac that uses a 5 GHz frequency band.

At this point, in a wireless LAN high density environment where the number of basic service sets (BBSs) is greater than the number of channels that are available at the same time in the same place, a plurality of BSSs use the same channel. In that case, due to interference among the BSSs that use the same channel, throughput of the BSS and throughput of an entire system are decreased. For this reason, in the wireless LAN, autonomous distributed access control called CSMA/CA protocol that performs transmission only when the channel is available is employed.

However, although the CSMA/CA protocol is performed, in the wireless LAN high density environment that many BSSs uses the same channel, because the frequency with which the channel is busy is increased, and a transmission opportunity to obtain the channel access right for each wireless LAN device is reduced, therefore throughput of a wireless LAN device and hence overall wireless LAN network is reduced.

iIn performing the carrier sense in the wireless station, a clear channel assessment (CCA) threshold, based on which it is determined whether a situation for the use of channel is idle or busy, is set using a received signal strength indication (RSSI). A technique called dynamic sensitivity control (DSC) that dynamically controls the CCA threshold and reduces more than necessary access deferral time which eventually increases the transmission opportunity has been studied (Non-Patent Documents 1, 2, and 3). This example will be described with reference to FIG. 8. It is noted that an example of downlink communication from an AP to a STA in which the wireless base station and the wireless station are defined as the AP and the STA, respectively, will be described.

(a) of FIG. 8 illustrates a state where two APs exist within a carrier sense range in accordance with CCA thresholds of the AP1 and the AP2. On the other hand, because a STA1 of a BSS1 and a STA2 of a BSS2 are both out of the carrier sense range on the other side, transmission from the AP1 of the BSS1 to the STA1 is possible during transmission from the AP2 of the BSS2 to the STA2. However, because a signal of the AP2 is detected by the carrier sense of the AP1 of the BSS1, the AP1 determines that a channel state is busy and waits for transmission to the STA1. This is a so called exposed station problem. Accordingly, as illustrated in (b) of FIG. 8, when the AP1 controls the CCA threshold value using the DSC and thus narrows the corresponding carrier sense range, although the AP2 is performing communication, the transmission by the AP1 is possible and system throughput is improved.

Furthermore, even if, the dynamic CCA threshold control, the transmission by the AP1 is possible, if a wireless LAN frame from another station within the BSS to which the AP1 itself belongs is being received, it is desirable to defer transmission. For example, BSS identification is performed with a preamble portion of the wireless LAN frame and a wireless LAN frame of the BSS to which the AP1 itself belongs is distinguished from other wireless signals. As illustrated in (a) of FIG. 9), if a wireless LAN frame that is transmitted from the STA1-2 of the BSS1 to which the AP1 itself belongs is detected in the AP1, the AP1 is set to defer transmission while receiving the corresponding LAN frame. On the other hand, if the wireless LAN frame of the BSS1 to which the AP1 itself belongs is not detected in the AP1, and if a wireless signal other than the BSS1 to which the AP1 itself belongs, or a wireless LAN frame, based on which a BBSID/BBS identifier of the BSS to which the AP1 itself belongs cannot be checked, is detected, as illustrated in (b) of FIG. 9, the AP1 controls the CCA threshold value using the DSC, and thus the transmission from the AP1 to the STA1-1 is set to be possible.

Non-Patent Document 1: "Proposed Specification Framework for TGax," Robert Stacey et al., doc.: IEEE 802.11-14/1453r2, 5 Nov. 2014

Non-Patent Document 2: The LAN/MAN Standards Committee,"IEEE Std 802.11TM 2012 IEEE standard for Information Technology Telecommunications and information exchange between systems—Local and metropolitan area networks—Specific requirements Part11: Wireless LAN Medium Access Control (MAC) and Physical Layer PHY Specifications Non-Patent Document 3: Graham Smith, "Dynamic Sensitivity Control Practical Usage," doc.: IEEE 802.11-14/0779r2.

DISCLOSURE

Problems to be Solved

Incidentally, with a DSC technology, in a situation of an exposed station or a situation where the wireless LAN frame with which the BSS identifier is not consistent is received, a method of determining the CCA threshold is not specifically established. For this reason, if the CCA threshold is not controlled with a suitable value, although dynamic control is performed, throughput also deteriorates in some cases. For example, if the CCA threshold is controlled to be increased excessively, despite the fact that a high interference power is received, the transmission is started and the transmission results in failure.

Furthermore, a method of selecting a suitable modulation and coding scheme (MCS) that corresponds to the CCA threshold is not determined. At this point, the MCS is a combination of a modulation scheme and a coding rate, and is suitably selected according to signal to interference and noise power ratio (SINR) that is required. For example, if a data rate is too high with the selection of the MCS, a transmission failure results as well, and if the data rate is too low, a decrease in capacity results without sufficiently utilizing transmission capability. Furthermore, if the transmission is actively performed using the DSC technology, in some cases, the wireless LAN frame is transmitted even for a period of time for which other BSSs are performing transmission and thus a SINR of the wireless LAN frame that is received in the destination station deteriorates. Therefore, in order to utilize to a maximum an advantage of the concurrent transmission that uses the DSC technology, independently of a normal MCS selection technology, there is a need to establish an optimal MCS selection technique when the DSC technology is used, but the effective technique has not yet been established.

A proposition of the present invention is to provide a wireless communication system and a wireless communication method that are capable of selecting a CCA threshold and an MCS that are optimal when a CCA threshold can be dynamically controlled using a DSC technology, acquiring a transmission opportunity efficiently in a wireless LAN high density environment, and improving system throughput.

Means for Solving the Problems

According to a first invention, there is provided a wireless communication system in which a plurality of basic service sets (BSSs) performing wireless transmission from a transmitting station to a destination station by performing access control based on CSMA/CA exist adjacent to each other, and in which wireless communication is performed by controlling a CCA threshold t considering an interference power value between each BSS that uses the same channel, in which the transmitting station includes a control block determining the CCA threshold value according to the interference power value of the BSS considered as an interference source, calculating a SINR in the destination station according to the interference power value, determining a MCS which is a combination of a modulation scheme and a code rate according to the SINR, and performing the access control based on the CSMA/CA.

In the wireless communication system according to the first invention, the control block of the transmitting station is configured to calculate the SINR in the destination station using the interference power value observed in the transmitting station and thereby determines the MCS.

In the wireless communication system according to the first invention, the control block of the transmitting station is configured to determine the MCS, determine a minimum SINR of the destination station according to the determined MCS, and estimate a distance between the transmitting station and the interference source according to the minimum SINR, and thereby determines the CCA threshold.

In the wireless communication system according to the first invention, the destination station includes a part notifying the transmitting station of interference power information including an interference power value observed in the destination station, and the control block of the transmitting station is configured to calculate the SINR in the destination station using the interference power value notified from the destination station and thereby determines the MCS.

In the wireless communication system according to the first invention, the control block of the transmitting station is configured to set initial values of the MCS and the CCA threshold, and to sequentially update the MCS and the CCA threshold according to an interference situation obtained by observing every fixed time. In the wireless communication system according to the first invention, a control block of the transmitting station is configured to calculate an average SINR from the interference situation observed by the destination station every fixed time, to update the MCS according to the average SINR, to calculate an evaluation function representing a ratio of channel busy time observed by the transmitting station every fixed time, and change the CCA threshold function according to a result of the calculation of the evaluation function. Furthermore, the control block of the transmitting station is configured to detect a BSS identifier included in a received frame, and to exclude the frame receiving time from the channel busy time when the detected BSS identifier is consistent with the BSS identifier of its own.

According to a second invention, there is provided a wireless communication method in which a plurality of BSSs performing wireless transmission from a transmitting station to a destination station by performing access control based on CSMA/CA exist adjacent to each other, and in which wireless communication is performed by controlling a CCA threshold that results from considering an interference power value between each BSS that uses the same channel, the transmitting station includes a step determining the CCA threshold according to the interference power value of a BSS considered as an interference source; a step calculating a signal to interference and noise power ratio (SINR) in the destination station according to the interference power value and determining a modulation and coding scheme (MCS), which is a combination of a modulation scheme and a code rate corresponding to the SINR, and the transmitting station sets the CCA threshold and the determined MCS to perform the access control by the CSMA/CA.

Advantageous Effects of the Invention

According to the present invention, because a CCA threshold is dynamically controlled according to an interference power value and an MCS is selected according to a SINR in a destination station, a transmission opportunity can be efficiently acquired in a wireless LAN high density environment and system throughput can be improved.

BRIEF DESCRIPTION OF THE DRAWINGS

FIG. 2 is a flowchart illustrating an example of a processing procedure in a first method of determining a CCA threshold and an MCS.

DETAILED DESCRIPTION OF THE EMBODIMENTS

Figure 1:
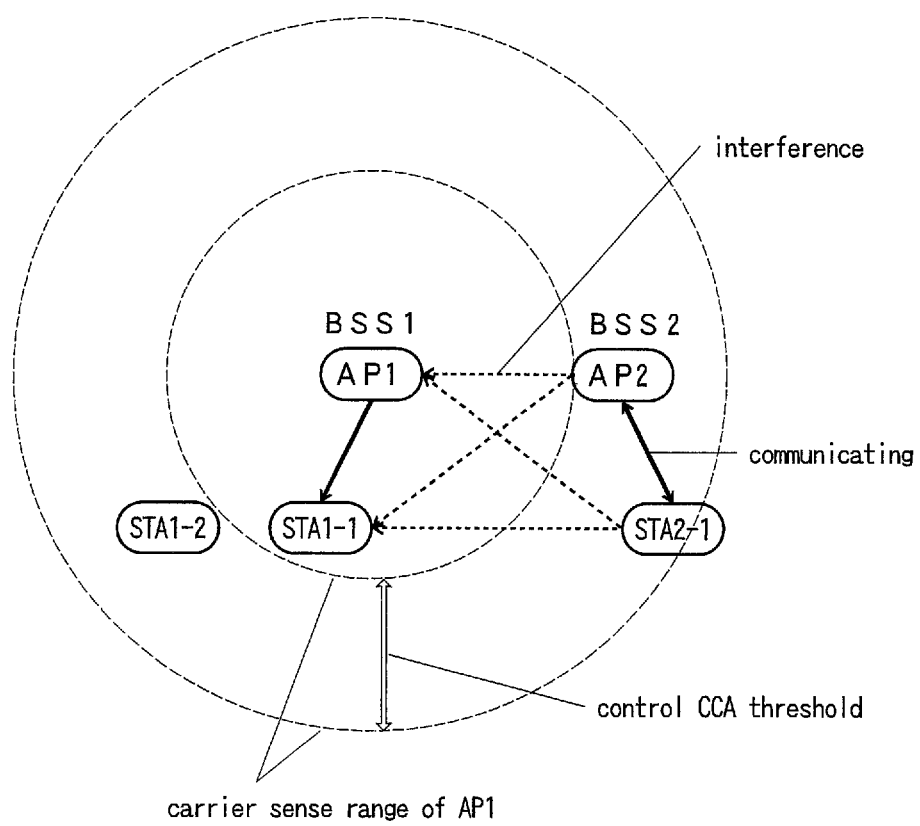
FIG. 1 is a diagram illustrating an example of a configuration of a wireless communication system.

FIG. 1 illustrates an example of a configuration of a wireless communication system according to the present invention.

In FIG. 1, a BSS1 is configured with an AP1, a STA1-1, and a STA1-2, and a BSS2 is configured with an AP2 and a STA2-1. A dashed-line circle of which a center is the AP1 indicates a carrier sense range in accordance with a CCA threshold of the AP1.

At this point, if a downlink circuit communication from the AP1 to the STA1-1 is performed, in a situation where the AP1 and the STA1-1 receive interference from the AP2 and the STA2-1 of the BSS2, which are in communication, a situation where the AP1 determines a CCA threshold and an MCS is illustrated. That is, a transmitting station is the AP1, and a destination station is the STA1-1. The AP2 and the STA2-1 are included in the carrier sense range in accordance with a pre-control CCA threshold of the AP1. Consequently, an interference signal that accompanies the AP2 and the STA2-1 is detected in the AP1, and communication is not possible due to CSMA/CA control. A dotted line arrow in FIG. 1 indicates the interference signal.

(First Method of Determining CCA Threshold and the MCS)

A first method of determining the CCA threshold and the MCS in the transmitting station is a procedure in which the CCA threshold is determined from interference power information that is observed in the transmitting station and in which the MCS is determined from the interference power information of the transmitting station on the assumption that interference situations of the transmitting station and the destination station are equal to each other and on the assumption of a SINR that results when reception is performed by the destination station.

FIG. 2 illustrates an example of a processing procedure in the first method of determining the CCA threshold and the MCS. At this point, for description, the AP1 and the STA1-1 that are illustrated in FIG. 1 are defined as the transmitting station and the destination station, respectively.

In FIG. 2, the transmitting station AP1 observes received powers of beacons of all BSSs other than the BSS on which the transmitting station AP1 itself belongs, as an interference power (S11). At this time, the transmitting station AP1 additionally observes received power value Ps of a frame that is transmitted from the destination station STA1-1, and uses the observed received power value Ps for calculation of the SINR that is assumed in the STA1-1, which will be described below. However, if the STA1-1 and the AP1 are defined as the transmitting station and the destination station, respectively, the transmitting station STA1-1 observes the received powers of the beacons of all BSSs that include the BSS to which the transmitting station STA1-1 itself belongs, and, with the beacon power values of the other BSSs being defined as the interference powers, uses the received power value Ps of the beacon of the BSS to which the transmitting station STA1-1 itself belongs, which is transmitted from the destination station AP1, for the calculation SINR that is assumed in the destination station AP1.

Next, the transmitting station AP1 calculates a sum ΣPobss of the beacon power values of the BSSs that are considered as interference sources, among the received powers of the beacons of all BSSs that are observed in Step S11, and determines the CCA threshold in such a manner that the calculated sum is exceeded (S12). DSC is performed according to the determined CCA threshold. Thus, in an example that is illustrated in FIG. 1, simultaneous transmissions by the AP1 and the AP2 are possible. It is noted that the transmitting station AP1 selects the BSS that is considered as an interference source, based on the received power of the beacon, but that for example, the number of BSSs may be limited, the BSS which causes the interference power so high that it cannot be dealt with even with a low MCS may be excluded, or the CCA threshold may not be higher than is necessary.

Next, the transmitting station AP1 assumes that the interference situation in the destination station STA1-1 is equivalent to that in the transmitting station AP1 itself, and based on the interference power information that is of itself observed in Steps S11 and S12, calculates the SINR that is assumed when the reception is performed in the destination station STA1-1, using the following equation (S13).

$$SINR = P_s / \Sigma P_{obss}$$

where Ps is the received power value of the frame that is received from the destination station STA1-1, and ΣPobss is the sum of the received powers of the beacons of the BSSs that are considered as the interference source.

Next, the transmitting station AP1 determines an optimal MCS from the SINR of the destination station STA1-1, which is assumed in Step S13 (S14). For example, a relation between the optimal MCS and a SINR value is in advance kept tabulated, and an optimal MCS is selected from the SINR. Alternatively, a relation of a bit error rate (BER) or a packet error rate (PER) to the SINR of each MCS is in advance kept tabulated, and a maximum MCS is selected from among MCSs that fall below a threshold for which a BER value or a PER value that is predicted from the SINR is set beforehand.

It is noted that when, in Steps S12 to S14, CCA threshold control and transmit power control (TPC) are linked to each other in the transmitting station and for example, a transmit power is lowered, if the CCA threshold is raised, compensation may be performed on the SINR, assumed in the destination station, by adjusting the observed received power value Ps and the MCS that corresponds to the SINR may be determined.

Furthermore, if link quality information is obtained from the destination station, the transmitting station may change the processing in Step S13 as follows. The transmitting station acquires a current optimal MCS based on the link quality information, and calculates a current SINR that is assumed in the destination station. Next, the transmitting station may calculate the SINR that is assumed when the reception is received in the destination station, based on the current SINR that is assumed, and on the interference power information that is of itself observed in Steps S11 and S12.

(Second Method of Determining the CCA Threshold and the MCS)

A second method of determining the CCA threshold and the MCS in the transmitting station is a procedure in which the MCS is determined ahead of time, in which a minimum SINR that falls below fixed BER and PER values in the destination station is determined from the determined MCS, and in which the CCA threshold is determined by estimating a distance between the transmitting station and the interference source, which can allow the minimum SINR.

Figure 3:
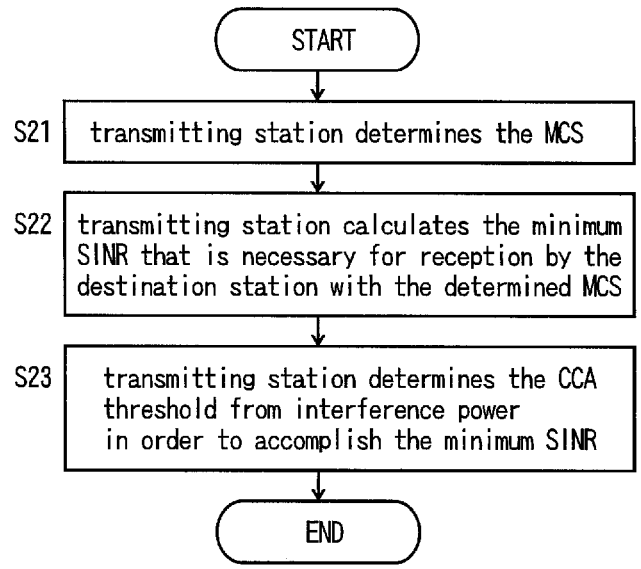
FIG. 3 is a flowchart illustrating an example of a processing procedure in a second method of determining the CCA threshold and the MCS.
Figure 4:
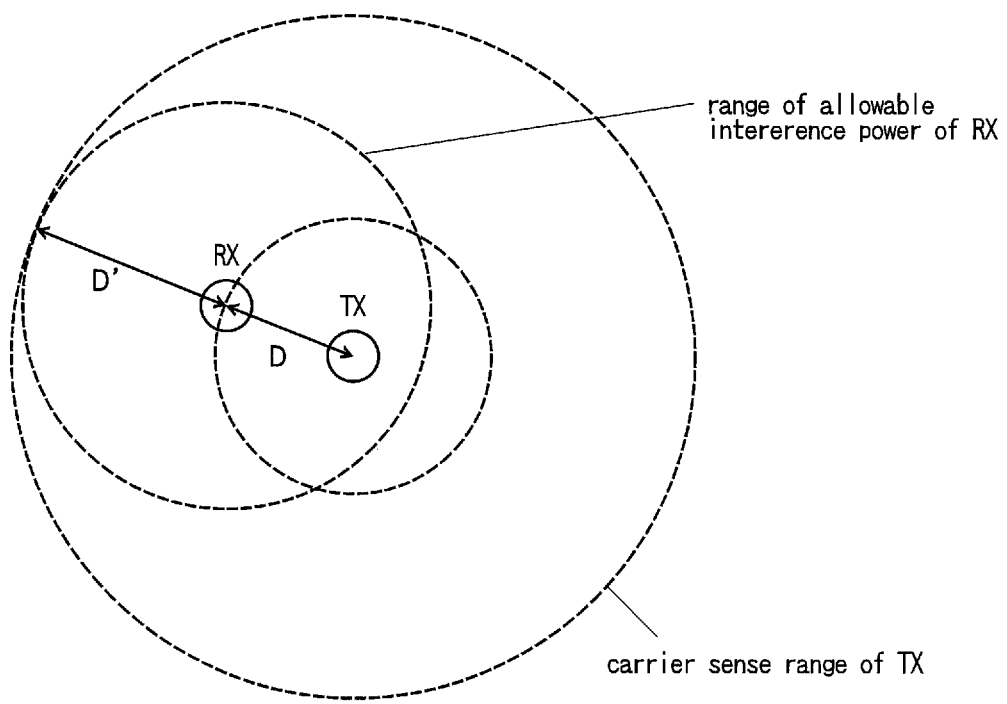
FIG. 4 is a diagram illustrating an example of determining the CCA threshold in the second method of determination.

FIG. 3 illustrates an example of a processing procedure in the second method of determining the CCA threshold and the MCS. At this point, for description, TX and RX that are illustrated in FIG. 4 are defined as the transmitting station and the destination station, respectively.

In FIG. 3, in the second method, first, the MCS of the transmitting station TX is determined (S21). Next, with the determined MCS, the minimum SINR that is necessary for reception by the destination station RX is calculated (S22). Next, from the interference power that can be allowed in order for the destination station RX to accomplish the minimum SINR, the distance between the transmitting station TX and the interference source is estimated and thus the CCA threshold is determined (S23).

For example, in FIG. 4, the processing in Step S23 is changed as follows. The transmitting station TX estimates a distance D to the destination station RX from the received power value of the frame that is transmitted from the destination station RX. A distance D' between the interference source and the destination station RX is estimated from the interference power that can be allowed in order to accomplish the minimum SINR that is calculated in Step S22. The CCA threshold is determined which corresponds to the carrier sense range in accordance with a distance D+D' between the transmitting station TX and the interference source. It is noted that a relation between each of the path losses L(D) and L(D') for each estimation distance and minimum SINRmin that is necessary in the destination station RX is as follows when a transmit power and an antenna gain of the transmitting station TX are defined as Pt and Gt, respectively, and a transmit power and an antenna gain of the interference source are defined as Pi and Gi, respectively.

$$SINRmin=Pt-Pi+Gt-Gi+L(D)-L(D').$$

It is noted that, when it is assumed that Pt=Pi and Gt=Gi, SINRmin=L(D)−L(D') is established.

Furthermore, in Steps S22 and S23, the processing that calculates the SINR of the destination station RX is changed as follows. It is assumed that the interference power of the destination station RX is the same as the interference power of the transmitting station TX, and thus based on the interference power that is observed by the transmitting station TX, the CCA threshold may be determined by calculating the SINR that is assumed in the destination station RX. Alternatively, the interference power that is observed in the destination station RX is fed back to the transmitting station TX, and thus the transmitting station TX may determine the CCA threshold by calculating the SINR that is assumed in the destination station RX.

Additionally, the CCA threshold control and the transmit power control (TPC) are linked to each other in the transmitting station TX, and for example, if the transmit power is lowered when the CCA threshold is raised, the compensation may be performed on the SINR that is assumed in the destination station, by adjusting the interference power that is observed by the destination station RX, and the CCA threshold that corresponds to the SINR may be determined.

(Third Method of Determining the CCA threshold and the MCS)

A third method of determining the CCA threshold and the MCS in the transmitting station is a procedure in which the CCA threshold is determined from the interference power information that is observed in the transmitting station and in which the MCSs are determined by predicting the SINR that results when the reception is performed by the destination station, from the interference power information that is observed in the destination station.

Figure 5:
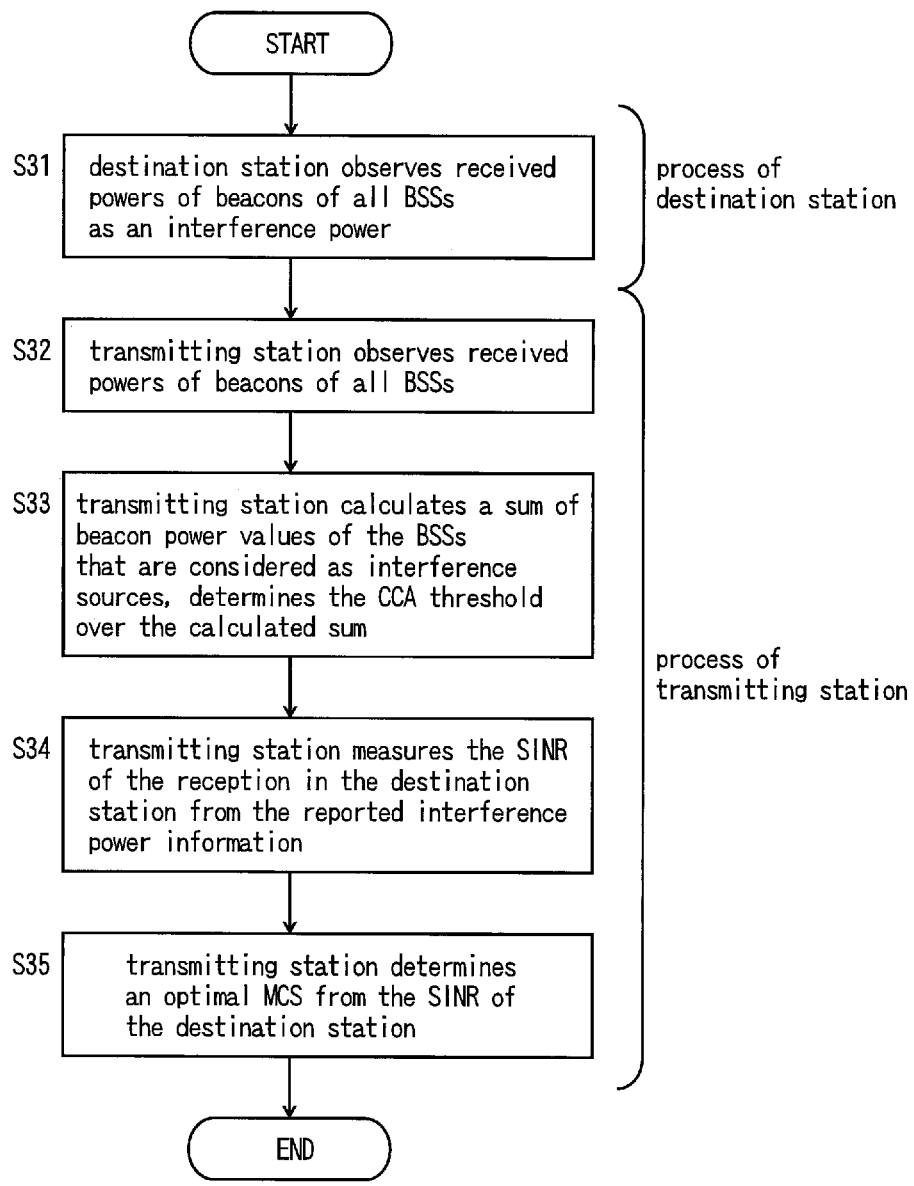
FIG. 5 is a flowchart illustrating an example of a processing procedure in a third method of determining the CCA threshold and the MCS.

FIG. 5 illustrates an example of a processing procedure in the third method of determining the CCA threshold and the MCS. At this point, for description, the AP1 and the STA1-1 that are illustrated in FIG. 1 are defined as the transmitting station and the destination station, respectively.

In FIG. 5, the destination station STA1-1 observes the received powers of the beacons of all BSSs, as the interference powers, and reports to the transmitting station AP1 the sum ΣPobss of the received powers of the beacons of the BSSs that are considered as the interference sources and BSS ID information, and the received power value Ps of the beacon that is received from the transmitting station AP1, as pieces of interference power information (S31). It is noted that the destination station STA1-1 selects the BSS which is considered as the interference source, based on the interference power information, but that for example, the number of BSSs may be limited or the BSS which causes the interference power so high that it cannot be dealt with even with a low MCS may be excluded. Furthermore, the destination station STA1-1 may respond with a result of the observation according to an interference power information collection request from the transmitting station AP1, and for example, may report a result of performing the observation for a beacon interval period or a period of time that is an integral multiple of the beacon interval period.

Next, the transmitting station AP1 that receives the report from the destination station STA1-1 observes the received powers of the beacons of all BSSs as the interference sources, and the beacon power value of the BSS that is considered as the interference that is reported with the interference power information (S32). Next, the transmitting station AP1 calculates the sum ΣPobss of the received powers of the beacons of the BSSs that are considered as interference sources that are observed in Step S32, and determines the CCA threshold in such a manner that the calculated sum is exceeded (S33).

Next, the transmitting station AP1 measures the SINR that results when the reception is performed by the destination station STA1-1, using the following equation, based on the interference power information that is reported from the destination station STA1-1 (S34).

$$SINR=Ps/\Sigma Pobss$$

It is noted that, because Ps and ΣPobss that are used for the prediction of the SINR are the received powers of the beacons that are observed in the destination station STA1-1, as in the first method of determination, the SINR can be calculated which is more precise than the SINR that is assumed from the received power of the beacon which is observed in the transmitting station AP1.

Next, the transmitting station AP1 determines an optimal MCS from the SINR that is predicted by the destination station STA1-1 (S35). For example, the relation between the optimal MCS and a SINR value is in advance kept tabulated, and the optimal MCS is selected from the SINR. Alternatively, the relation of the bit error rate (BER) or the packet error rate (PER) to the SINR of each MCS is in advance kept tabulated, and a maximum MCS is selected from among the MCSs that fall below a threshold for which the BER value or the PER value that is predicted from the SINR is set beforehand.

It is noted that the CCA threshold control and the transmit power control (TPC) are linked to each other in the transmitting station, and for example, if the transmit power is lowered when the CCA threshold is raised, the SINR may be predicted by adjusting the received power value Ps of the destination station, which is observed and reported in Step S31, and the MCS that corresponds to the SINR may be determined.

Furthermore, if the link quality information is obtained from the destination station, the transmitting station may change the processing in Step S34 as follows. The transmitting station acquires a current optimal MCS based on the link quality information, and calculates a current SINR that is assumed in the destination station. Next, the transmitting station may predict the SINR that results when the reception is performed by the destination station, based on the assumed current SINR and the interference power information of the destination station, which is observed and reported in Step S31.

(Fourth Method of Determining the CCA threshold and the MCS)

A fourth method of determining the CCA threshold and the MCS in the transmitting station is a procedure in which initial values of the MCS and the CCA threshold are set in the transmitting station, in which an evaluation function is calculated from the interference situation that is observed for every fixed time, and in which the MSC selection and sequential updating of the CCA threshold are performed.

Figure 6:
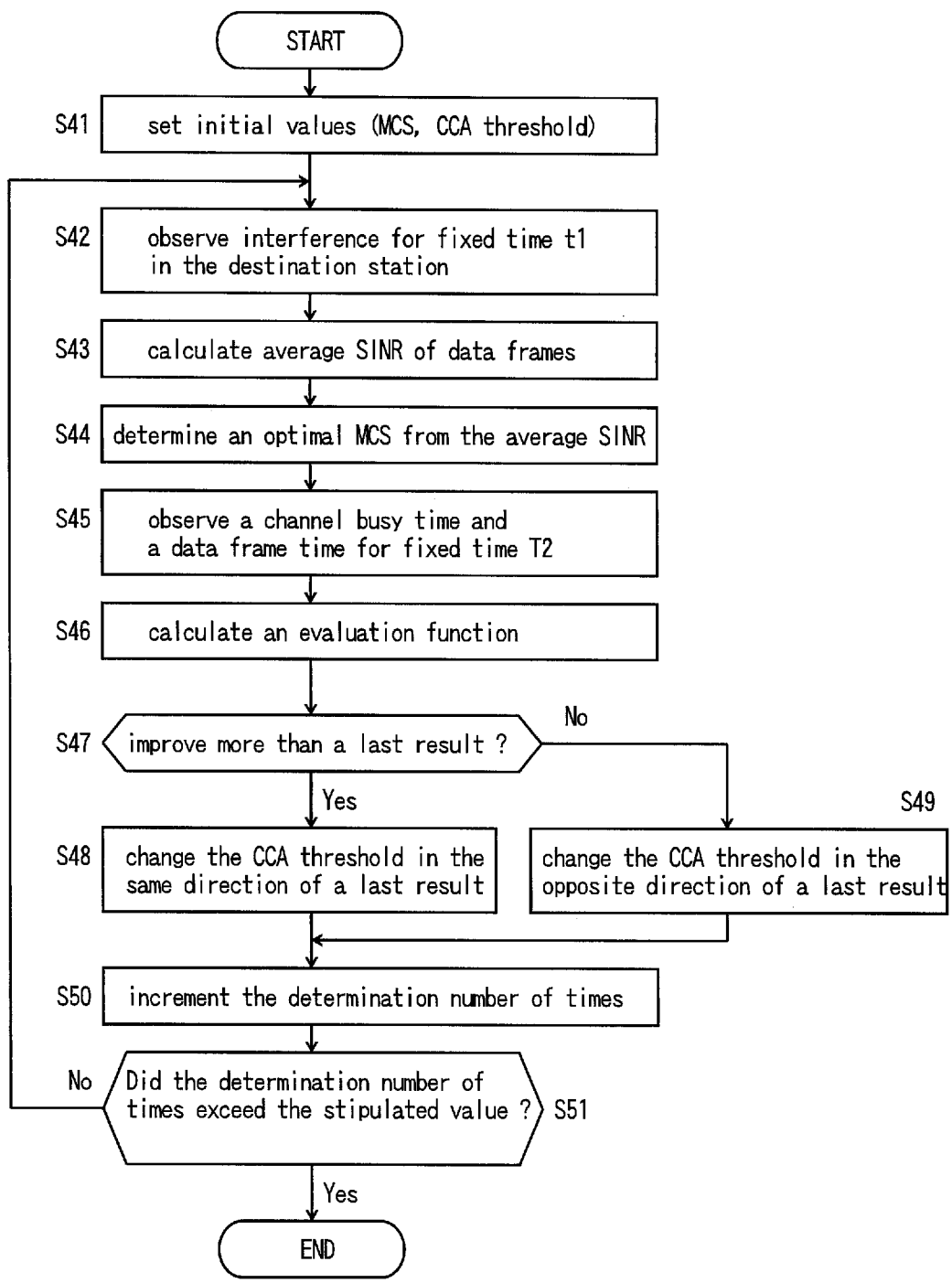
FIG. 6 is a flowchart illustrating an example of a processing procedure in a fourth method of determining the CCA threshold and the MCS.

FIG. 6 illustrates an example of a processing procedure in the fourth method of determining the CCA threshold and the MCS. At this point, for description, the AP1 and the STA1-1 that are illustrated in FIG. 1 are defined as the transmitting station and the destination station, respectively.

In FIG. 6, the initial values of the MCS and the CCA threshold are set in the transmitting station AP1 (S41), the interference situation is observed for every fixed time t1 (S42) in the destination station STA1-1, an average SINR of data frames is calculated (S43), and an optimal MCS is determined from the average SINR (S44). For example, the relation between the optimal MCS and a SINR value is in advance kept tabulated, and the optimal MCS is selected from the SINR. Alternatively, the relation of the bit error rate (BER) or the packet error rate (PER) to the SINR of each MCS is in advance kept tabulated, and a maximum MCS is selected from among the MCSs that fall below a threshold for which the BER value or the PER value that is predicted from the SINR is set beforehand.

Next, the transmitting station AP1 observes a channel busy time and a data frame time for a fixed time t2 (S45), and calculates an evaluation function f(p) for CCA threshold evaluation (S46). At this point, an example of the evaluation function f(p) is described.

$$f(p)=L_F/(T_B+T_{B0}+T_F)$$

$L_F$: the average number of bits of one frame $T_B$: an average channel busy time that is observed until one frame is transmitted.

However, a channel busy period of time due to a signal (a BBS identifier of the BSS to which the transmitting station AP1 itself belongs and a BSS threshold within a frame are consistent with each other) of the BSS to which the transmitting station AP1 itself belongs is excluded from the average channel busy time.

$T_{B0}$: the average of DIFS+backoff time that are necessary until one frame is transmitted $T_F$: a time length of an average data frame of one frame p: CCA threshold Next, it is determined whether or not a result of the calculation of the evaluation function is improved than a last result. (S47). If more improvement is made, the CCA threshold is changed in the same direction as for the previous time (S48), and if more improvement is not made, the CCA threshold is changed in the opposite direction to that for the previous time (S49). Because there is no previous evaluation value as for the initial values of the MCS and the CCA threshold, the CCA threshold is changed, for instance, in an arbitrary direction. The number of times that the determination is made using the evaluation function described above is incremented (S50), and processing operations in Step S42 and subsequent steps are repeated until a stipulated number of times is reached (S51).

Figure 7:
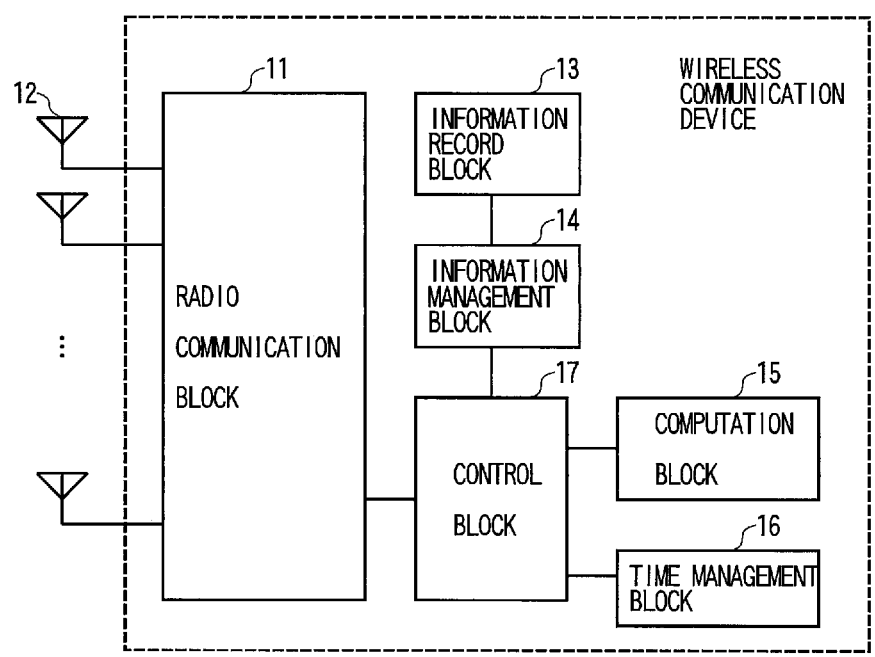
FIG. 7 is a diagram illustrating an example of a configuration of a wireless communication system according to the present invention.
Figure 8:
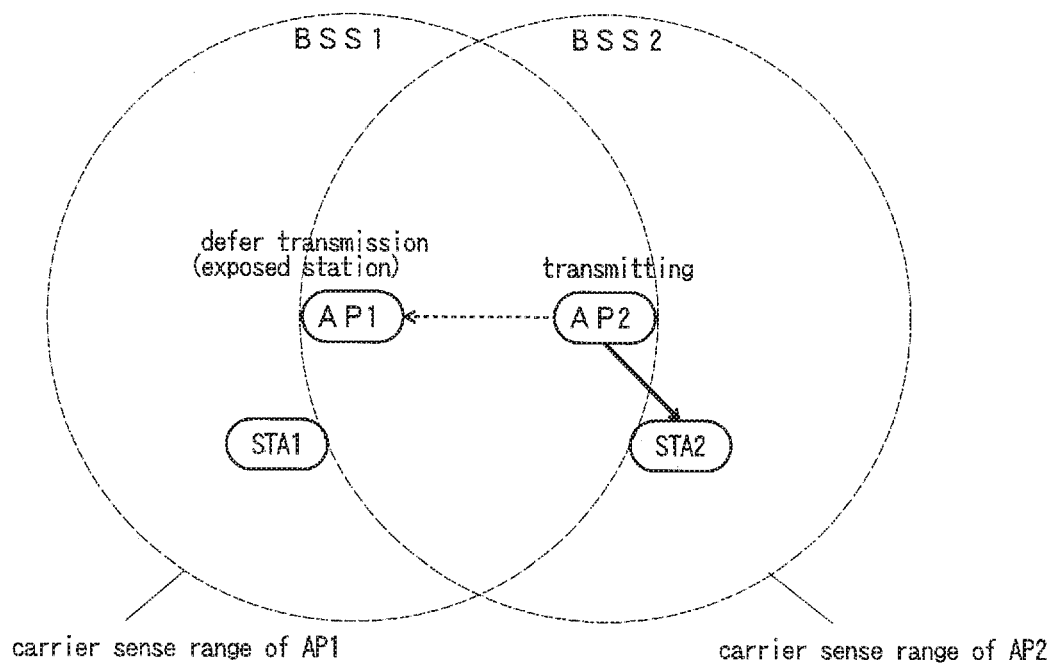
FIG. 8 is a diagram illustrating a first example of control of the CCA threshold in downlink communication.
Figure 8:
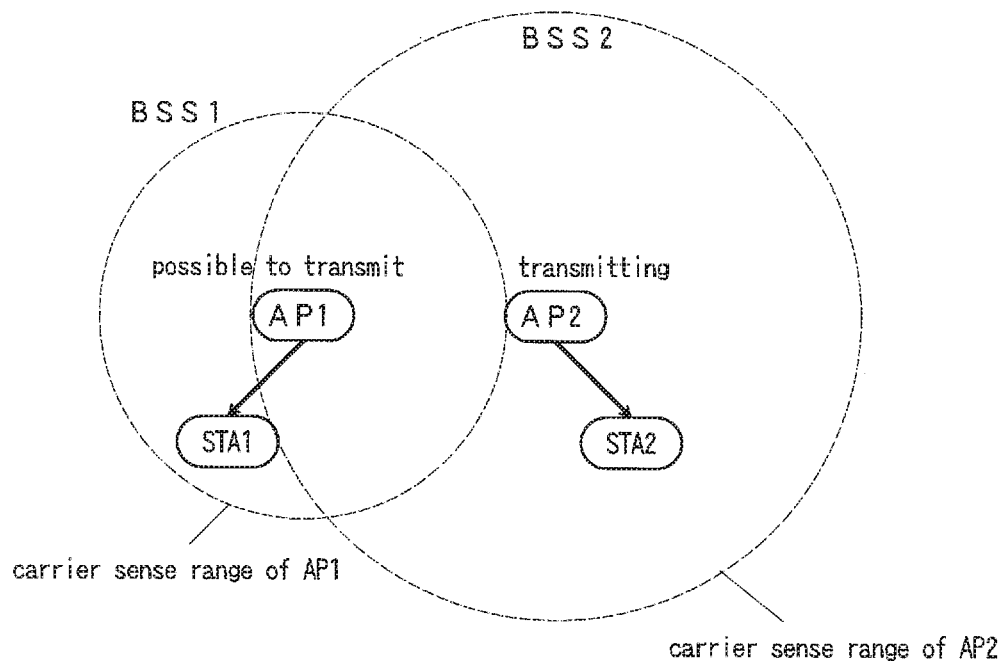
Figure 9:
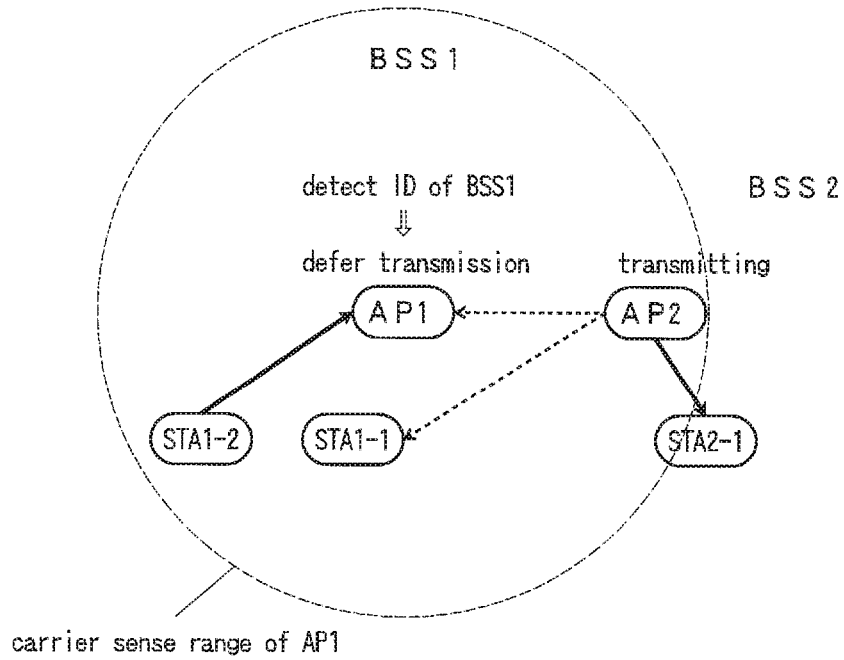
FIG. 9 is a diagram illustrating a second example of the control of the CCA threshold in the downlink communication.
Figure 9:
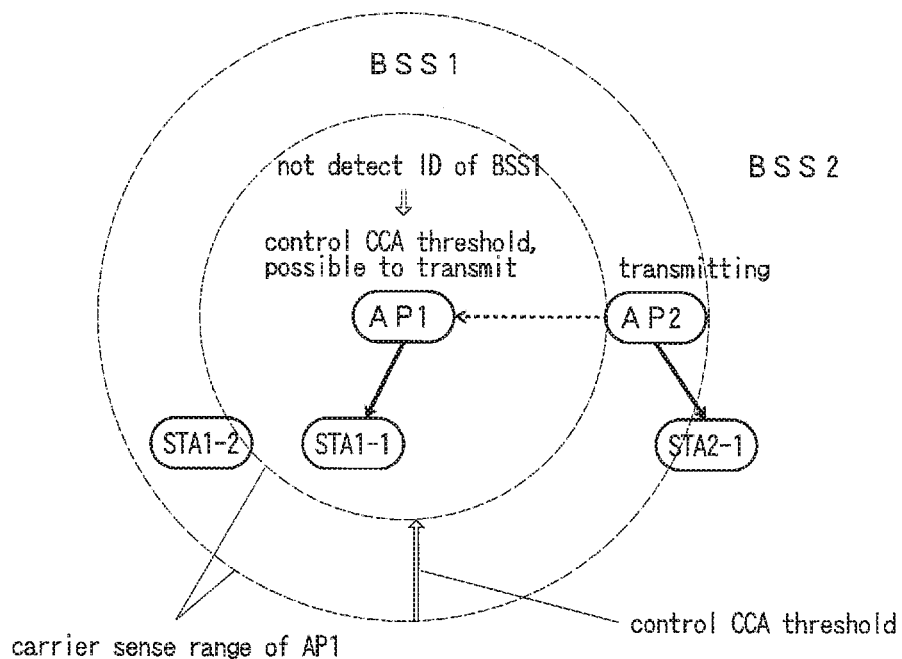

FIG. 7 illustrates an example of a configuration of a wireless communication device according to the present invention. It is noted that the transmitting station and the destination station have a configuration in common.

In FIG. 7, a radio communication block 11 transmits and receives a radio signal through an antenna 12. An information record block 13 and an information management block 14 record and manage, respectively, numerical values that are necessary when the SINR that is to be expected is calculated, such as a receive power value of a frame that is transmitted from the destination station, a receive power value of a frame that is transmitted from a station which causes interference with other BSSs, and a transmit power value and antenna gain value of a wireless LAN station. Furthermore, an optimal MCS for the SINR that results when the MCS is determined using a goodput or PER data is kept tabulated. Additionally, a channel busy time that is taken when measuring a channel busy time is also recorded and managed.

A computation block 15 computes an assumption value of a prediction value of the SINR from information that is recorded and managed in the information record block 13 and the information management block 14, and performs the evaluation function.

A time management block 16 measures a channel busy time due to a signal other than a received signal of the BSS to which the Time Management Block 16 itself belongs.

A control block 17 performs information input and input processing according to the processing in each step of each of the first to fourth methods of determination. Furthermore, when it comes to the AP, a function, such as broadcasting at a timing for collection of the interference power information, is added.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A transmitting station comprising:
   a processor; and
   a storage medium having computer program instructions stored thereon, when executed by the processor, perform to:

determine a clear channel assessment, CCA, threshold value according to an interference power value, where the interference power value is a sum of received power of beacons between each basic service set, BSS, that uses the same channel as observed in the transmitting station;

calculate a signal to interference and noise power ratio, SINR, in a destination station according to the interference power value between each BSS that uses the same channel and a received power value of a frame that is received from the destination station;

determine a modulation and coding scheme, MCS, which is a combination of a modulation scheme and a code rate according to the SINR; and set the determined CCA threshold and the determined MCS to perform access control based on carrier sense multiple access with collision avoidance, CSMA/CA.

2. The transmitting station according to claim 1, wherein the computer program instructions further perform to determine the MCS;

determine a minimum SINR of the destination station according to the determined MCS;

estimate the distance between the transmission station and the interference source according to the minimum SINR; and thereby determine the CCA threshold.

3. The transmitting station according to claim 1, wherein the computer program instructions further perform to: set initial values of the MCS and the CCA threshold, and to sequentially update the MCS and the CCA threshold according to an interference situation obtained by observing every fixed time.

4. The transmitting station according to claim 3, wherein the computer program instructions further perform to:

calculate an average SINR from the interference situation observed by the destination station every fixed time;

update the MCS according to the average SINR;

calculate an evaluation function representing a ratio of channel busy time observed by the transmitting station every fixed time; and change the CCA threshold function according to a result of the calculation of the evaluation function.

5. The transmitting station according to claim 4, wherein the computer program instructions further perform to:

detect a BSS identifier included in a received frame, and to exclude the frame receiving time from the channel busy time when the detected BSS identifier is consistent with the BBS identifier of its own BSS.

6. A wireless communication method in which a plurality of basic service sets, BSSs, performing wireless transmission from a transmitting station to a destination station by performing access control based on carrier sense multiple access with collision avoidance, CSMA/CA, exist adjacent to each other, and in which wireless communication is performed by controlling a CCA threshold that results from considering an interference power value observed in the transmitting station, wherein:

in the transmitting station, the method includes:

a step determining the CCA threshold according to the interference power value observed in the transmitting station, where the interference power value is sum of received power of beacons between each basic service set, BSS, that uses the same channel as observed in the transmitting station;

a step calculating a signal to interference and noise power ratio, SINR, in the destination station according to the interference power value between each BSS that uses the same channel and a received power value of a frame that is received from the destination station;

a step determining a modulation and coding scheme, MCS, which is a combination of a modulation scheme and a code rate, corresponding to the SINR; and settings the determined CCA threshold and the determined MCS to perform the access control by the CSMA/CA.

7. A wireless communication system including a plurality of basic service sets, BSSs, adjacent to each other for performing wireless transmission from a transmitting station to a destination station by performing access control based on carrier sense multiple access with collision avoidance, CSMA/CA, and for performing wireless communication by controlling a clear channel assessment, CCA, threshold considering an interference power value between each BSS that uses the same channel, where the interference power value is a sum of received power of beacons between each basic service set, BSS, that uses the same channel as observed in the transmitting station, wherein:

the destination station is configured to notify the transmitting station of interference power information including an observed interference power value observed in the destination station, and the transmitting station includes a processor; and a storage medium having computer program instructions stored thereon, when executed by the processor, perform to:

determine a clear channel assessment, CCA, threshold value according to the observed interference power value between each basic service set, BSS, that uses the same channel;

calculate a signal to interference and noise power ratio, SINR, in a destination station using the observed interference power value between each BSS that uses the same channel notified from a destination station and a received power value of a frame that is received from the destination station;

determine a modulation and coding scheme, MCS, which is a combination of a modulation scheme and a code rate according to the SINR; and set the determined CCA threshold and the determined MCS to perform the access control based on carrier sense multiple access with collision avoidance, CSMA/CA.

\* \* \* \* \*